Dec. 7, 1971  YUJI YOSHIYAMA ETAL  3,625,057
ULTRASONIC FLOWMETER
Filed Oct. 29, 1968  7 Sheets-Sheet 7
FIG. 13
(a) INPUT TO 80 S
(b) INPUT TO 80 R
(c) OUTPUT FROM 80 $nf_1 > nf_2$
(c') OUTPUT FROM 80 $nf_1 < nf_2$
(d) OUTPUT FROM 82
(e) OUTPUT FROM 84
(d') OUTPUT FROM 82
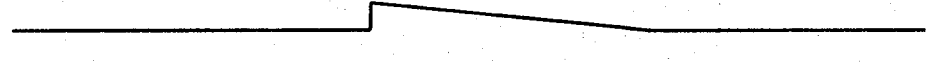
(e') OUTPUT FROM 84
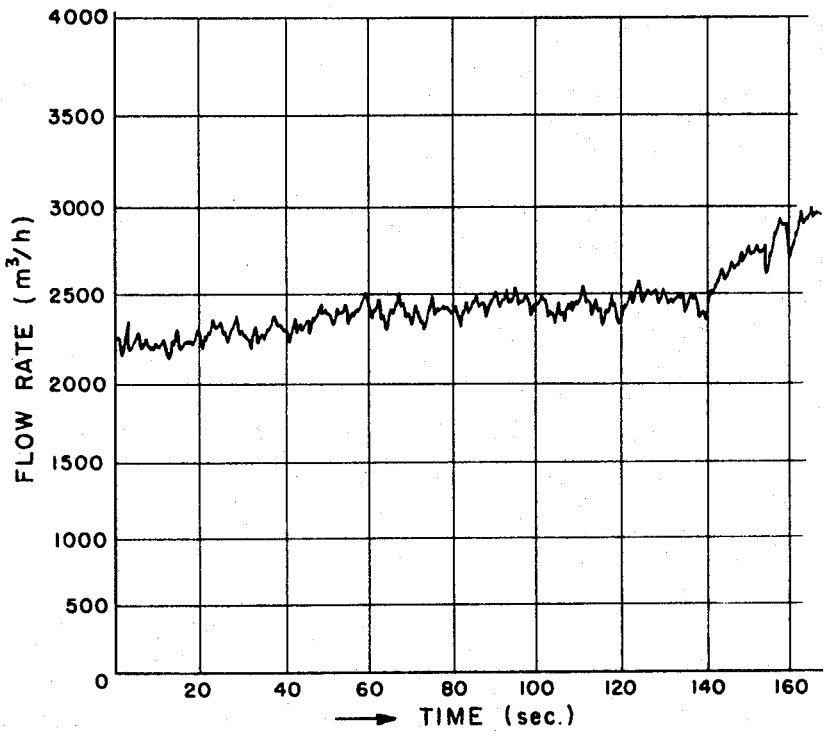
FIG. 14

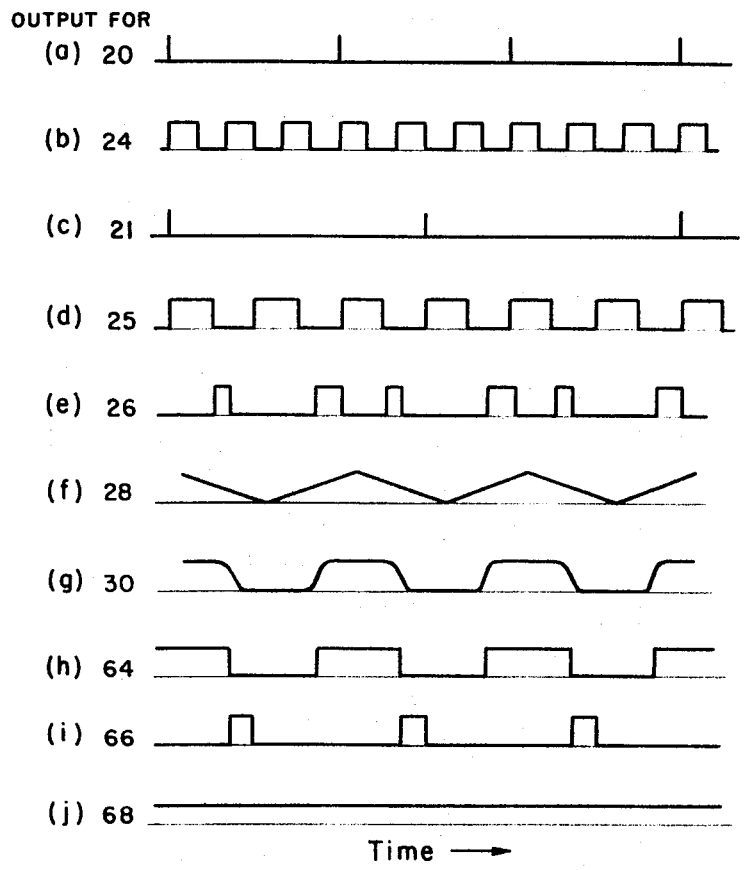
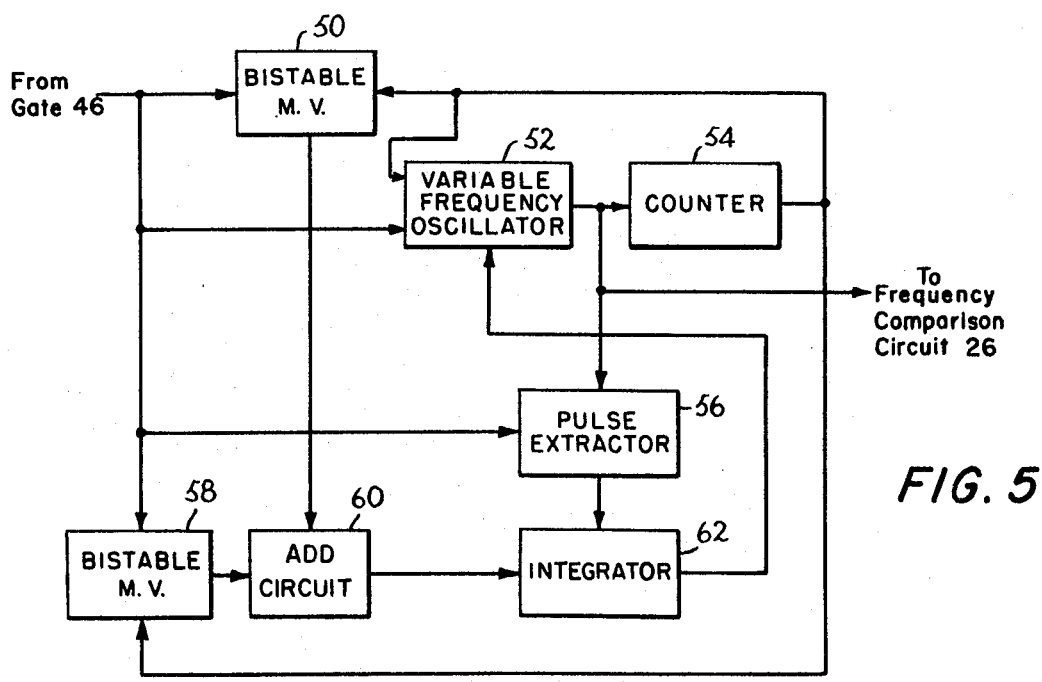

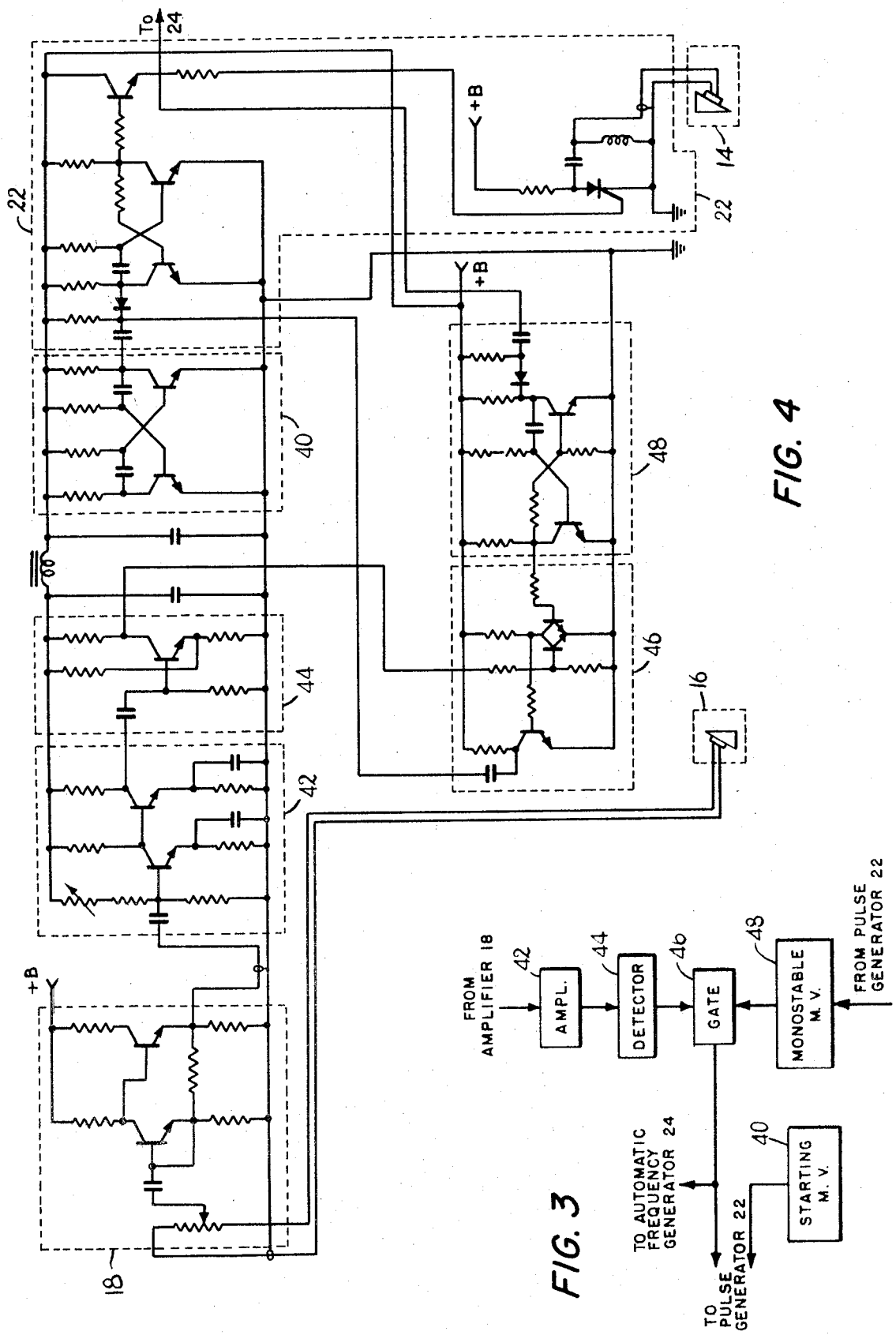

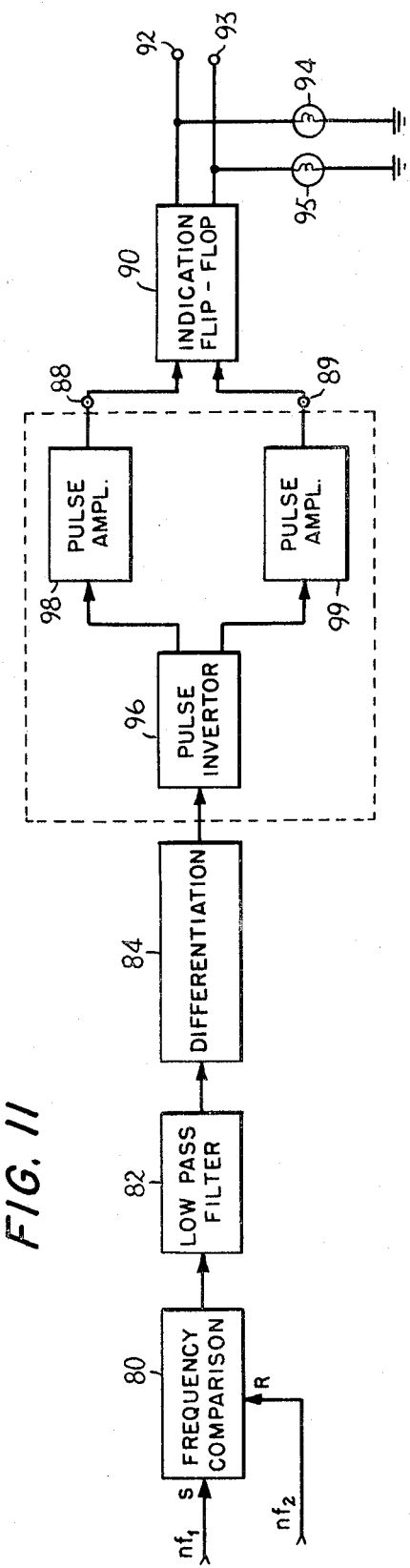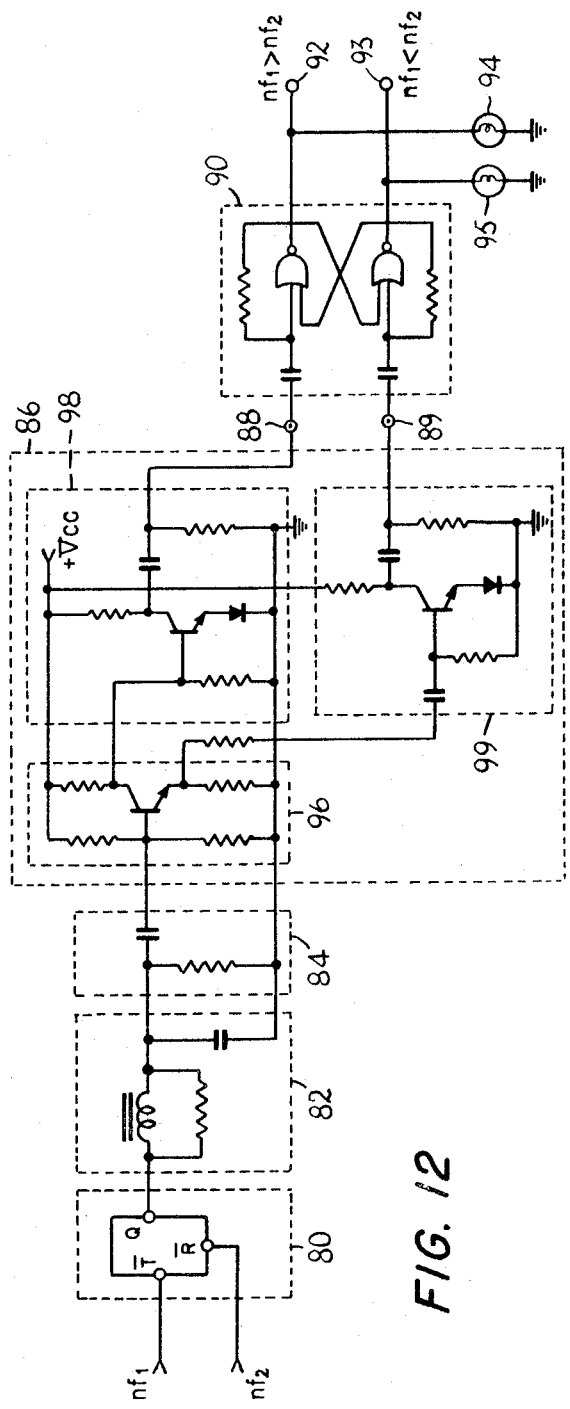

United States Patent Office 3,625,057
Patented Dec. 7, 1971

3,625,057
ULTRASONIC FLOWMETER
Yuji Yoshiyama, Takayoshi Ezawa, and Kazuhiro Akuta, Amagasaki, Hyogo, Japan, assignors to Mitsubishi Denki Kabushiki Kaisha, Tokyo, Japan
Filed Oct. 29, 1968, Ser. No. 771,394
Claims priority, application Japan, Nov. 1, 1967, 42/70,379
Int. Cl. G01p 5/00
U.S. Cl. 73—194 A 3 Claims

ABSTRACT OF THE DISCLOSURE

Signals from each of two sing-around loops, each including a pair of ultrasonic transducer-transmitters and transducer-receivers, are frequency multiplied by a predetermined number by an automatic frequency multiplier irrespective of a variation in their pulse recurrence period. Then the signals from the multipliers are applied to a frequency comparison circuit to develop a difference frequency-signal between the multiplied frequencies resulting from both loops. This difference signal is converted to an analog quantity representing a measure of a velocity of flow of the associated fluid. A time delay circuit can be connected in each sing-around loop to impart to the frequency difference signal a predetermined value or to electrically adjust a distance between both elements. Means are provided for determining from the frequency difference a direction in which the fluid is flowing.

BACKGROUND OF THE INVENTION

This invention relates to an ultrasonic flowmeter and more particularly to a flowmeter disposed on an outer wall surface of the conduit to continuously measure an instantaneous velocity of flow or flow rate of a fluid flowing through the conduit.

In order to measure a velocity of flow of a fluid flowing through a conduit by an ultrasonic flowmeter disposed on the outer wall surface of the conduit, it has been previously the practice to direct a beam or ultrasonic wave through the fluid first from the upstream to downstream side thereof and then vice versa to separately read out a pair of sing-around frequencies for the respective beam. Then a difference between the sing-around frequencies is calculated to provide a measure of the velocity of flow. If the conduit has an inside diameter exceeding one meter then several seconds were required for reading out both sing-around frequencies. This led to the impossibility of determining a variation in velocity of flow that might occur during the reading out of both sing-around frequencies. In other words, the conventional type of ultrasonic flowmeters just described could not continuously measure an instantaneous velocity of flow of a fluid.

Also, in order to measure an instantaneous velocity of flow of a fluid, there have already been proposed ultrasonic flowmeters of the type including two ultrasonic transducer-transmitter elements and two ultrasonic transducer-receiver elements to provide a difference between sing-around frequencies for both sets of the transmitter and receiver elements. Such flowmeters could be sometimes called "a double beam sing-around type." As will be well-known, a difference between a pair of the sing-around frequencies should have a zero value for a null or zero velocity of flow, and as it approximates the zero value a response speed of a digital-to-analog conversion circuit involved increases. To avoid this increase in response speed of the conversion circuit, the difference between the two sing-around frequencies has been preselected to have a predetermined bias value other than zero for a null velocity of flow of the associated fluid.

To this end, the transducer-transmitter and transducer-receiver elements or probes have been previously adjusted in their positions where they are mounted to the associated conduit when a fluid flowing through the latter has a zero velocity of flow. This measure led to the following disadvantages:

(1) After the probes attached to the conduit, through any suitable material such as a grease or the like transmissive of an ultrasonic wave has been displaced on the conduit, the air was apt to penetrate into the material resulting in many difficulties encountered in operation; and (2) Even very small changes in positions of the probes where they are mounted on the conduit, affected much a difference between output frequencies therefrom. Therefore, it is not easy to provide the required bias value as above described. Also if it is attempted to smoothly accomplish the displacement of the probes relative to the conduit then it is required to use a fine control for moving the probes.

Further, any detection circuit incorporated into an ultrasonic flowmeter of the conventional double beam sing-around type to detect a difference between two sing-around frequencies could detect the absolute magnitude of the difference therebetween but not determine the polarity thereof or which of the frequencies is higher. That is, it could not determine a direction in which the associated fluid is flowing.

SUMMARY OF THE INVENTION

Accordingly it is a general object of the invention to eliminate the abovementioned disadvantages of the conventional ultrasonic flowmeters.

It is another object of the invention to provide a new and improved ultrasonic flowmeter capable of measuring and recording a velocity of flow or flow rate of a fluid flowing through a conduit at an extremely high response speed to thereby determine any variation in velocity of flow even within a large diameter conduit that could not be heretofore measured by any of the conventional electromagnetic flow meters, and turbulent flows and vorticies of the fluid as well as determining from the recorded waveform the acoustic effect of a wave of condensation and rarefaction resulting from cavitations and pressure waves produced by the associated water wheel and/or pump and also determining a thickness of scale growing by deposition on the internal wall surface of the conduit.

It is still another object of the invention to provide a new and improved ultrasonic flowmeter including means for electrically delaying the sing-around signals to permit a difference between two sing-around frequencies to be easily controlled in order to impart a predetermined fixed bias value to the difference between those frequencies and/or to eliminate the difficulty of adjusting a distance between the associated transducer-transmitter and transducer-receiver elements.

It is another object of the invention to effect the simultaneous determination of a direction of flow and flow rate in a conduit where a fluid is varying in direction of flow from time to time as in the case of pumping-up power plants and water pipings.

With the above cited objects in view, the invention resides in an ultrasonic flow meter apparatus comprising a section of conduit through which a fluid to be measured flows. A first closed sing-around loop including a first pair of ultrasonic transducer-transmitter and receiver elements are attached to a section of the conduit to produce a first train of sing-around signals having a pulse recurrence frequency as a function of an instantaneous velocity of flow of the fluid. A second closed sing-around loop includes a second pair of ultrasonic transducer-transmitter and transducer-receiver elements attached to the section of conduit to produce a second train of sing-around signals having a pulse recurrence frequency as a function of the instantaneous velocity of flow. Means are provided for providing a difference in the pulse recurrence frequencies between both the trains and converting the differences between the frequencies to an analog quantity providing a representative of a measure of the instantaneous velocity of flow. The apparatus is characterized by one automatic frequency multiplier means connected to each of the sing-around loops to frequency multiply the sing-around signals of the associated train by a predetermined number $n$ irrespective of a variation in the pulse recurrence frequency of the sing-around signals.

In a preferred embodiment of the invention the automatic frequency multipliers may comprise a first bistable multivibrator capable of being normally set with alternate ones of the sing-around signals and reset with the remaining signals to form a rectangular pulse having a duration equal to a period of time between the particular pair of succeeding sing-around signals. A variable frequency oscillator normally responding to each of the sing-around signals generates a train of pulses with a controlled frequency. A counter is connected to the variable frequency oscillator to stop the oscillation of the latter upon counting the $n$th pulse from the oscillator and a pulse extractor is connected to the variable frequency oscillator to respond only to that pair of succeeding pulses following each of the sing-around signals in the particular train of pulses being generated by the oscillator to produce a rectangular pulse having a duration equal to the recurence period of the pulses being generated by the oscillator. A second bistable multivibrator responds to both the $n$th pulse from the variable frequency oscillator and one sing-around signal following the $n$th pulse to form a rectangular pulse. An ADD circuit is connected to the first and second bistable multivibrators, a differential integrator connected to both the ADD circuit and the pulse extractor provides a control signal. Means are connected for applying the control signal to the variable frequency oscillator to control the oscillatory frequency thereof so as to maintain a predetermined fixed duration of the rectangular pulse from the second bistable multivibrator, and other means for causing the sing-around signals applied to the first and second bistable multivibrators and the variable frequency oscillator to be ineffective during the counting operation of the counter.

Each of the sing-around loops may be advantageously provided with a time delay circuit in order to impart the difference in the frequencies between both the trains a predetermined value for zero velocity of flow or to adjust a distance between the transducer-transmitter and transducer-receiver elements.

In order to determine a direction of flow of a fluid, there may be conveniently provided a frequency comparison circuit having applied thereto the two trains of sing-around signals frequency multiplied by the respective automatic frequency multiplier and means to provide a difference in frequency between the two trains of signals. A low-pass filter is connected to the frequency comparison circuit. A differentiation circuit is connected to the low-pass filter to differentiate the output from the latter, and a polarity sensing circuit connected to the differentiation circuit provides a control signal determined by the polarity of the output from the differentiation circuit. The readout is by a pair of indicators connected to the polarity sensing circuit to be selectively energized by the latter whereby whichever of the indicators is energized indicates the direction of flow.

BRIEF DESCRIPTION OF THE DRAWING

The invention will become more readily apparent from the following detailed description taken in conjunction with the accompanying drawings in which:

FIG. 2 is a graph illustrating waveforms developed at various points in the flow meter shown in FIG. 1;

FIG. 3 is a block diagram illustrating in more detail two sing-around loops shown in FIG. 1;

FIG. 4 is a schematic circuit diagram of one of the sing-around loop illustrated in FIG. 3;

FIG. 5 is a block diagram of an automatic frequency multiplier illustrated in FIG. 1 and constructed in accordance with the principles of the invention;

FIG. 11 is a block diagram of an electric circuitry for determining a direction in which a fluid is flowing through the associated conduit, in accordance with the principles of the invention;

FIG. 12 is a schematic circuit diagram of the circuitry illustrated in FIG. 11;

FIG. 13 is a graph illustrating waveforms developed at various points in the circuitry shown in FIGS. 11 and 12; and FIG. 14 is one example of records provided by the invention.

DESCRIPTION OF THE PREFERRED EMBODIMENTS

Figure 1:
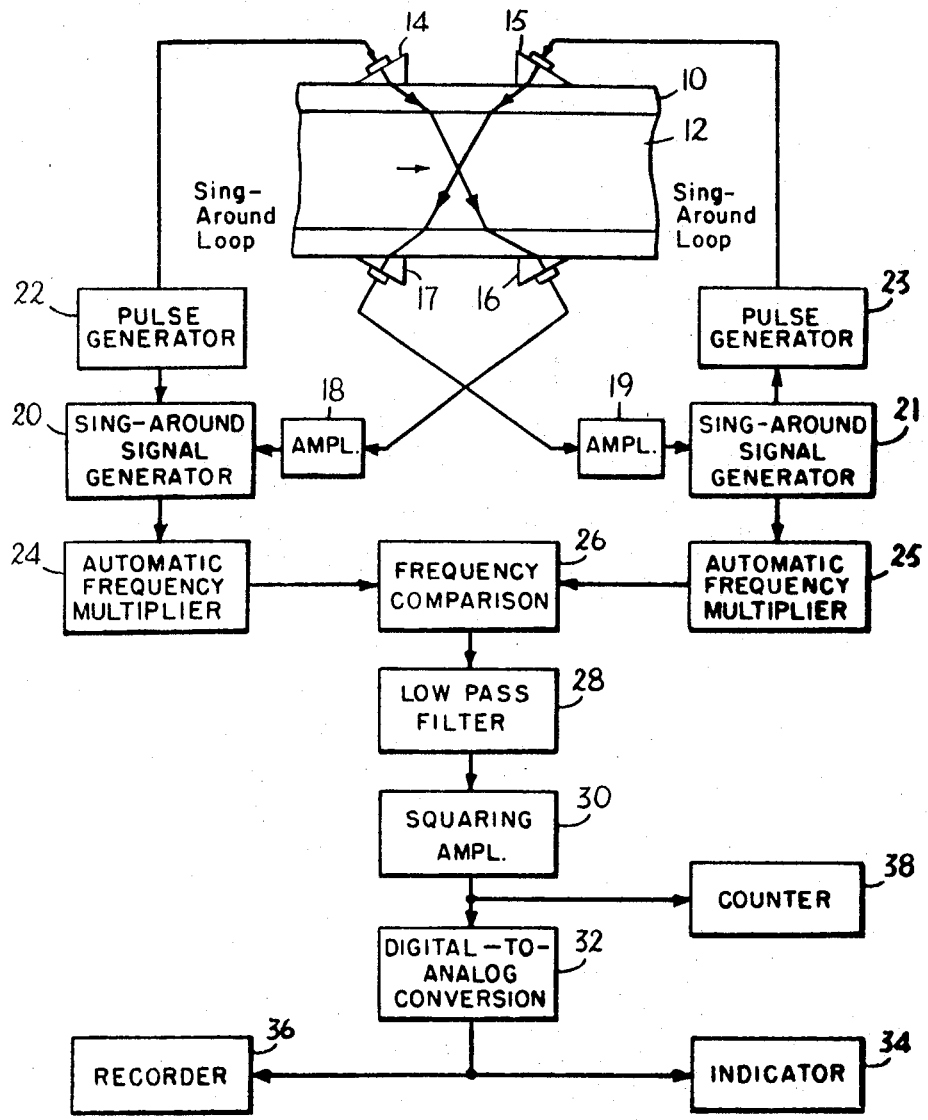
FIG. 1 is a block diagram of a sing-around type ultrasonic flow meter embodying the principles of the invention.

Referring now to FIG. 1 of the drawings, there is illustrated a sing-around type ultrasonic flow meter apparatus constructed in accordance with the principles of the invention. The arrangement illustrated comprises a section of conduit 10 through which a fluid 12, to be measured, flows in the direction of the arrow. A pair of ultrasonic transmitter elements or probes 14 and 15 are rigidly secured in space relationship and in a common diametrical plane of the section 10 on the outer wall surface thereof to direct beams of ultrasonic waves in the form of pulses downstream and upstream of the flowing fluid 12 at predetermined angles to the direction of flow, and a pair of ultrasonic transducer-receiver elements or probes 16 and 17 are rigidly secured in spaced relationship on the outer wall surface of the section 10 and at diametrically opposing positions to the respective transducer-transmitter elements 15 and 14. Thus the transducer-receiver elements 16 and 17 are in positions where they receive the beams of ultrasonic wave from the transmitter elements 14 and 15 respectively. It is noted that the transducer-transmitter and transducer-receiver elements 14, 15 and 16, 17 are so positioned that the ultrasonic path between the transducer-transmitter and transducer-receiver elements 14 and 16 is substantially equal to that between the elements 15 and 17. As shown by the arrows in FIG. 1 both the beams of ultrasonic waves from the transducer-transmitter elements 14 and 15 intersect each other substantially on the longitudinal axis of the conduit section 10 and substantially symmetrical with respect to a plane passing through the intersection point of the beams and perpendicular to the longitudinal axis of the section 10. All the probes are preferably of the same construction.

The arrangement further comprises an amplifier 18 connected to the transducer-receiver element 16, a sing-around signal generator 20 connected to the amplifier 18 and a pulse generator 22 connected to the generator 22 and adapted to intermittently energize the transducer-transmitter element 14 to form one closed sing-around loop.

FIG. 1 also shows the other closed sing-around loop composed of the transducer-transmitter 15, the transducer-receiver 17 and the components identical to those as above described and designated by the odd reference numerals following the even reference numerals designating the corresponding components of the one sing-around loop.

The outputs of the sing-around signal generators 20 and 21 are connected to automatic frequency multipliers 24 and 25 connected to a frequency comparison circuit 26. Serially connected to the comparison circuit 26 are a low-pass filter 28, a squaring amplifier 30 and a digital-to-analog conversion circuit 32 in the order named. The amplifier 30 preferably has a high input resistance and a high gain. The conversion circuit 32 is connected to both an analog indicator 34 and an analog recorder 36.

In operation, each of the ultrasonic transducer-transmitter elements 14 and 15 is energized in the manner as will be described hereinafter by the pulse generator 22 or 23 to transmit a beam or ultrasonic wave in the form of a pulse to the opposed transducer-receiver element 16 or 17 through the fluid 12 flowing through the section of conduit 10 in the direction of the arrow shown in FIG. 1. Each transducer-receiver element 16 or 17 converts the received beam or ultrasonic wave to a corresponding electrical signal which is, in turn, amplified by an amplifier 18 or 19 and applied to the sing-around signal generator 20 or 21. In the manner as will be described in detail hereinafter, the generator 20 or 21 provides a train of pulses having a pulse recurrence period equal to an interval of time required for the particular ultrasonic wave to travel between the associated transducer-transmitter and transducer-receiver elements 14 and 16 or 15 and 17. The generators 20 and 21 provide trains of pulses as illustrated at waveforms "a" and "c" in FIG. 2 and such waveforms are well-known as being "sing-around" signals. The sing-around signal generator 20 or 21 also controls the associated pulse generators 22 or 23 to permit the latter to periodically produce pulses which are amplitude modulated with a sinusoidal wave having any suitable ultrasonic frequency. Thus the transducer-transmitter element 14 or 15 periodically produces the beam or ultrasonic wave in the form of a pulse. The beams are received by the transducer-receiver elements 16 and 17 and the process as above described is repeated.

The sing-around signals have a sing-around frequency which is a function of a velocity of flow at which the fluid 12 is flowing through the conduit 10. Thus the sing-around signals originating from the upstream transducer-transmitter element or probe 14 have a sing-around frequency $fu$ expressed by the equation $$fu = \left[ \frac{d}{\sin\theta(c+v_d\cos\theta)} + \tau \right]^{-1} \quad (1)$$

wherein
$d$ = the inside diameter of the conduit
$v_d$ = the average velocity of flow of the beam or ultrasonic wave
$c$ = the velocity of propagation at which fluid travels through stationary fluid
$\theta$ = the angle between the beam or ultrasonic wave and the longitudinal axis of the conduit, and
$\tau$ = the total sum of time delays occurring in the wall of conduit, probes and electric circuits connected to them. The sum has a fixed magnitude dependent upon the construction of the sing-around loop.

That frequency may be sometimes an upstream sing-around frequency. Similarly the sing-around signal originating from the transducer-transmitter element 15 has a downstream sing-around frequency $fd$ expressed by the equation $$fd = \left[ \frac{d}{\sin\theta(c-v_d\cos\theta)} + \tau \right]^{-1} \quad (2)$$

Since the velocity of propagation $c$ at which the ultrasonic wave travels through the stationary fluid is far greater than the velocity of flow of the fluid to be measured the difference $\Delta f$ between the upstream and downstream sing-around frequencies $fu$ and $fd$ can be approximately expressed by the equation $$\Delta f = \frac{v_d \sin\theta}{d}\left(1+\frac{\tau C}{d}\sin\theta\right)^{-1} \quad (3)$$

Therefore the velocity of flow $v_d$ is given by the equation $$v_d = \left[\frac{d}{\sin 2\theta}\left(1+\frac{\tau C}{d}\sin\theta\right)\right]^2 \Delta f \quad (4)$$

Assuming that the factor $$\left[\frac{d}{\sin 2\theta}\left(1+\frac{\tau C}{d}\sin\theta\right)\right]$$

has been preliminarily known as a scale factor in the Equation 4. It is understood that the difference between the upstream and downstream sing-around frequencies yields the average velocity flow of the fluid on the beams of ultrasonic wave.

From Equation 3 it will be appreciated that the larger the inside diameter of the conduit, the lower the frequency difference will be. For example, if a fluid is flowing at a velocity of flow of 4.5 meters per second through a conduit having an inside diameter of 1.8 meters, then the frequency difference will become as low as 1.4 cycles per second.

The invention contemplates measuring accurately a velocity of flow of a fluid flowing through a conduit at a high response speed even in the case of a difference between the upstream and downstream sing-around frequencies is small as above described.

To this end, the sing-around signal having the pulse recurrence frequency $fu$ or $fd$ is applied to the associated automatic frequency multiplier 24 or 25 to provide an output in the form of rectangular pulses having a pulse recurrence frequency equal to the sing-around frequency multiplied by a predetermined number as shown at waveform "b" or "d" in FIG. 2. The details of construction and operation of the multiplier 24 or 25 will be described hereinafter. It has been found that the predetermined number preferably ranges from twenty to three hundred. The upstream and downstream sing-around signals low in sing-around frequency have now been formed into trains of rectangular pulses increased in pulse recurrence frequency.

Then both the sing-around signals thus increased in sing-around frequency are applied to the frequency comparison circuit 26 and processed by the series devices 28, 30 and 32 to form an analog quantity providing a measure of the particular average velocity of flow or flow rate of the fluid which will be described in detail hereinafter.

If it is desired to monitor the velocity of flow, a digital counter 38 may be operatively coupled to the amplifier 30 to count the pulses therefrom.

Referring now to FIGS. 3 and 4 wherein the same reference numerals designate the components corresponding to those shown in FIG. 1, there is illustrated in block form the details of sing-around loop formed of the components 14, 16, 18, 20 and 22 or 15, 17, 19, 21 and 23 as previously described in conjunction with FIG. 1. As the sing-around loop operatively associated with each pair of transducer-transmitter and transducer-receiver elements is identical in construction and operation to that operative device associated with the other pair of transducer-transmitter and transducer-receiver elements. The loop will now be described in conjunction with the elements 14 and 16 and the components of the other loop are designated by the odd reference numerals following the even reference numerals designating the corresponding components of the one loop.

The sing-around generator 20 includes a starting astatic multivibrator 40 actuating the pulse generator 22 which, in turn, applies a pulse which is amplitude modulated with a sinusoidal wave having any suitable ultrasonic frequency, such as one megacycle per second, to the ultrasonic transmitter element 14 whereupon a pulse or ultrasonic wave is directed to the opposed transducer receiver element 16 through the fluid 12 flowing through the section of the conduit 10. The transducer-receiver element 16 converts the received pulse or ultrasonic wave to the corresponding electrical signal. The signal is amplified by the amplifier 18 and further amplified to a desired level thereof by the succeeding amplifier 42. Then the amplified signal is detected by a detector circuit 44 and formed into a rectangular pulse. The rectangular pulse is applied to the pulse generator 22 through a gate circuit 46 having a gating time controlled by a monostable multivibrator 48. The pulse generator 22 responds to the applied pulse to pulse transmitter element 14 as previously described and the process just described is repeated.

The pulse generator 22 also pulses the monostable multivibrator 48 which immediately produces a rectangular pulse having a duration corresponding to an interval of time for which the gate circuit 46 is blocked to maintain the sing-around loop in its inoperative state for purpose of preventing external noise applied to the receiver element from producing spurious signals which appears as if the sing-around frequency would have increased by a factor of two or even three or more. For all practical purposes it is sufficient if the gate circuit 46 is blocked for an interval of time equal to approximately 70% to 80% of the interval of time between two succeeding sing-around signals or of an interval of time for which an ultrasonic pulse from the transmitter element reaches the associated transducer-receiver element.

In this way, the gate circuit 46 provides a train of pulses such as shown at waveform $a$ in FIG. 2. The pulses preferably have a pulse recurrence frequency ranging from 0.3 to 7 kilocycles per second.

The components of the sing-around loop as above described may be of conventional construction such as shown in FIG. 4.

The output from the gate circuit 46 or 47 is also supplied to the automatic frequency multiplier 24 or 25 which will be described in more detail with reference to FIGS. 5, 6 and 7.

As in the sing-around loops, the automatic frequency multipliers 24 and 25 are identical in construction and operation to each other and one of the multipliers 24 will now be described with reference to FIGS. 5, 6 and 7.

Figure 6:
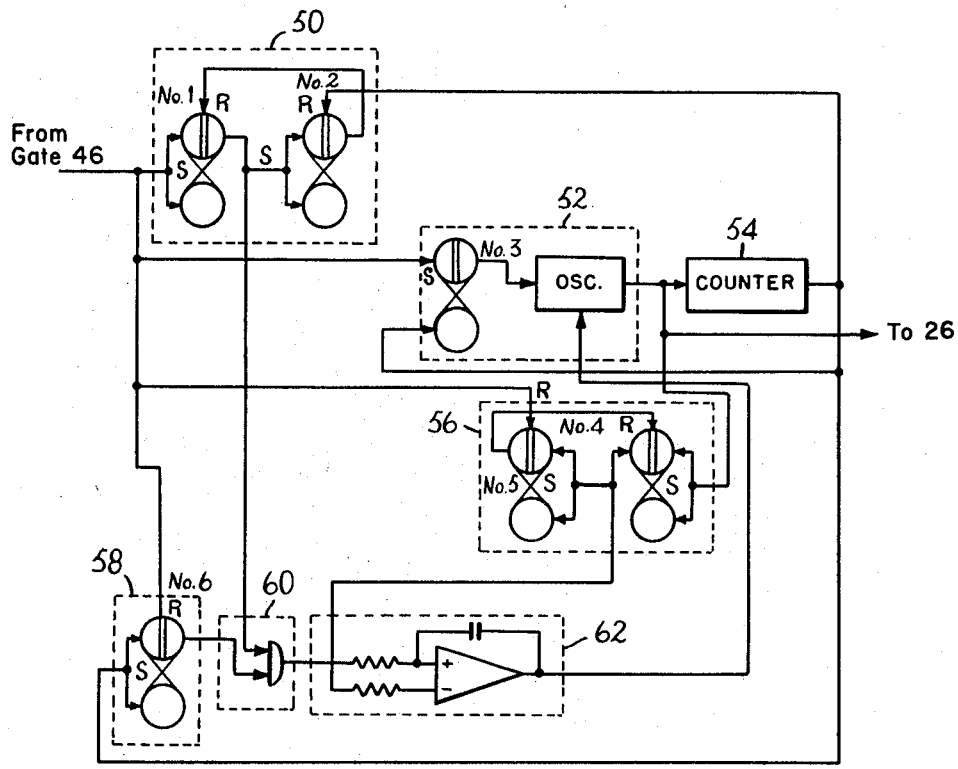
FIG. 6 is a schematic circuit diagram of the automatic frequency multiplier illustrated in FIG. 5.

As shown in FIGS. 5 and 6 wherein the same reference numerals designate the identical components, the sing-around signals from the gate circuit 46 (see FIGS. 3 and 4) are successively supplied to both a first bistable multivibrator 50 and a variable frequency oscillator 52 for frequency multiplication. The multivibrator 50 includes a pair of FLIP-FLOP Nos. 1 and 2 and the oscillator 52 includes a FLIP-FLOP No. 3 having supplied thereto the sing-around signals and a variable frequency oscillatory circuit OSC connected to that FLIP-FLOP. The oscillatory circuit OSC is connected to a counter 54 and also to a FLIP-FLOP No. 4 of a pulse extractor 56 including another FLIP-FLOP No. 5 having applied thereto the sing-around signals. The sing-around signals are further supplied to a second bistable multivibrator 58 comprising a FLIP-FLOP No. 6. This FLIP-FLOP is connected to one input to an ADD/circuit 60 having the other input connected to the output of the FLIP-FLOP No. 1 of the first multivibrator 50. The ADD/circuit 60 is connected to one input to a differential integrator 62 having the other input connected to the pulse extractor 50. The integration circuit 62 is connected to the variable frequency oscillator 52 to control the oscillatory frequency thereof.

The operation of the arrangement shown in FIGS. 5 and 6 will now be described with reference to FIG. 7. It is assumed that all the FLIP-FLOPS as shown in FIG. 6 are put in their reset position. A first one of the sing-around signals SA–1 (see FIG. 7a) is supplied to the FLIP-FLOP Nos. 1 and 3 at the set terminals to set them, and also to the reset terminal of the FLIP-FLOP No. 5 to reset it. The FLIP-FLOP No. 1 provides a high output while the FLIP-FLOP No. 3 permits the oscillatory circuit OSC to generate a train of pulses with a controlled frequency. The counter 54 counts those pulses and upon counting the $n$th pulse where $n$ is a predetermined number by which the frequency of the sing-around signal has to be multiplied, it provides an output pulse which is, in turn, applied to the FLIP-FLOP No. 3 to reset the latter whereupon the oscillatory circuit OSC ceases to oscillate. Thus it will be appreciated that the first sing-around signal SA–1 effects generation of a train of $n$ pulses such as shown at B–1 in FIG. 7b, and that the FLIP-FLOP No. 3 is then reset and ready for responding to the succeeding or second sing-around signal SA–2.

The pulses generated by the oscillatory circuit OSC are further applied to the set terminal of the FLIP-FLOP No. 4 of the pulse extractor 56. The FLIP-FLOP No. 4 is held in its reset position when the FLIP-FLOP No. 5 is in its set position. The FLIP-FLOP No. 4 reset with the first sing-around signal SA–1 is adapted to respond to the tail edge of a first pulse of the pulse train from the oscillatory circuit OSC to be set and also to a second pulse thereof to be reset resulting in the formation of a rectangular pulse having a duration equal to a repetition period of pulses being generated by the oscillatory circuit OSC. The resetting of the FLIP-FLOP No. 4 is accompanied by the setting of the associated FLIP-FLOP No. 5 with the FLIP-FLOP No. 4 held in the reset position until the second sing-around signal SA–2 occurs. Thus the FLIP-FLOP No. 4 does not respond to the third and succeeding pulses from the oscillatory circuit OSC. In other words, the FLIP-FLOP No. 4 responds to the first sing-around signal to form only a single rectangular pulse having a duration corresponding to the repetition period of pulses being produced by the oscillatory circuit as shown at waveform F–1 at FIG. 7f.

In addition, the output from the counter 54 is applied to the reset terminal of the FLIP-FLOP No. 2 to return it back to its reset position while releasing the FLIP-FLOP No. 1 from its set position. Thus the latter FLIP-FLOP is ready for responding to the succeeding or second sing-around signal SA–2 to be reset. Also the output from the counter 54 is applied to the set terminal of the FLIP-FLOP No. 6 to set it.

Then the succeeding or second sing-around signal SA–2 is supplied to the frequency multiplier 24 to reset the FLIP-FLOP No. 1 while setting the associated FLIP-FLOP No. 2 and holding the FLIP-FLOP No. 1 in its reset position. As a result, the FLIP-FLOP No. 1 produces a rectangular pulse as shown at waveforms D–1 in FIG. 7d. The pulse D–1 has a duration equal to the interval of time between the signals SA–1 and –2. At the same time, the FLIP-FLOP Nos. 5 and 6 are reset. Therefore the extractor 56 also produces a rectangular pulse as shown at waveform F–1 in FIG. 7f and the multivibrator 58 or FLIP-FLOP No. 6 develops a rectangular pulse as shown at waveform C–1 in FIG. 7c.

As shown in FIG. 7c, the waveform C–1 starts on the occurrence of the tail edge of the $n$th pulse from the oscillatory circuit OSC and terminates on the appearance of the succeeding sing-around signal SA–2.

Upon the appearance of the second sing-around signal SA–2, the process as above described is repeated except for the FLIP-FLOP No. 1 being held in its reset position to produce no rectangular pulse such as pulse D–1. Since a third sing-around signal appears after the $n$th pulse of a second train B–2 from the oscillatory circuit OSC that signal permits the FLIP-FLOP No. 1 to produce a second pulse as shown at waveform D–2 in FIG. 7d. Thus it will be appreciated that alternate ones of the sing-around signals such as SA–1, SA–7, . . . serve normally to set the FLIP-FLOP No. 1 and the remaining signals such as SA–2, SA–4, reset it to successively produce the rectangular waveform D–1, D–2 . . . having a duration corresponding to the pulse repetition period thereof.

It is now assumed that upon the appearance of the third sing-around signal SA–3, the oscillatory circuit OSC has started to oscillate at such a low frequency that the $n$th pulse occurs after fifth sing-around signal SA–5 due to some external disturbance.

Under the assumed condition the third sing-around signal SA–3 will also start the same process as previously described in terms of the first signal SA–1, but the FLIP-FLOP No. 1 reset with the fourth signal SA–4 is not set with the fifth signal SA–5 because the counter 56 does not yet provide a pulse permitting the FLIP-FLOP No. 1 to be released from its reset position. This prevents the FLIP-FLOP No. 1 from responding to the fifth signal SA–5 to produce an output such as D–1 or D–2. The occurrence of the $n$th pulse of the particular train B–3 due to the signal SA–3 causes the FLIP-FLOP No. 1 to be released from its reset position as previously described. Therefore the FLIP-FLOP No. 1 can respond to the sixth signal SA–6 to produce a rectangular pulse D–3 terminating at the occurrence of the succeeding sing-around signal.

Also because the counter 54 does not count the $n$th pulse from the oscillatory circuit OSC the sing-around signals SA–4 and –5 are ineffective operating the oscillatory circuit.

However the FLIP-FLOP No. 5 responds to each of the sing-around signals to be reset and also to that pair of succeeding pulses following each sing-around signal in the particular pulse train from the oscillatory circuit OSC to form a rectangular pulse in the manner as previously described. These pulses are shown at waveforms F–3, –4 and –5 in FIG. 7$f$.

Figure 7:
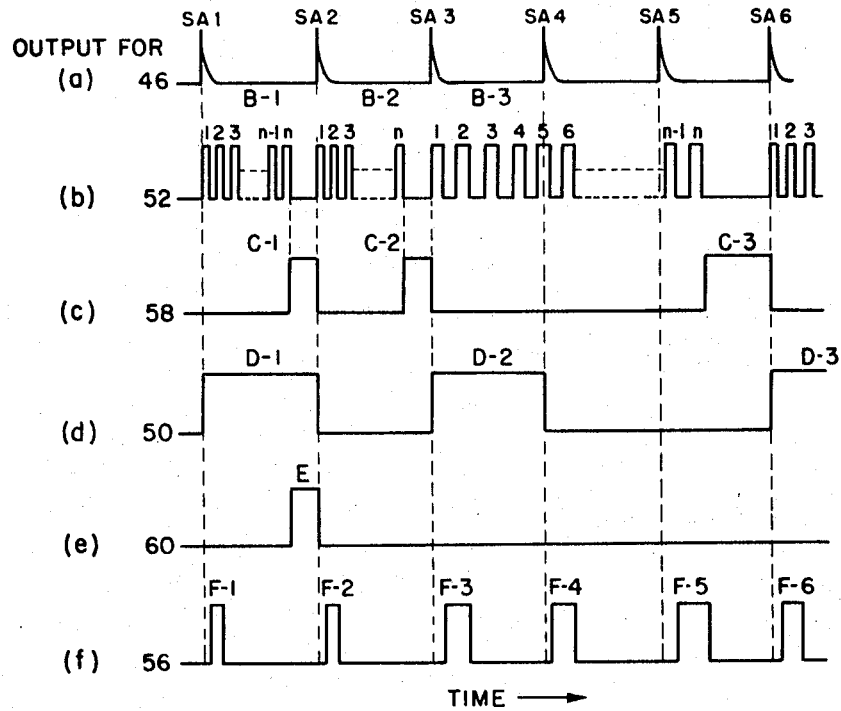
FIG. 7 is a graph illustrating waveforms developed at various points in the multiplier shown in FIGS. 5 and 6.

On the other hand, the outputs from the FLIP-FLOPS Nos. 1 and 6 or the multivibrators 50 and 58 are applied to the ADD circuit 60 to a logic product signal as shown at waveform E in FIG. 7$e$. The ADD circuit 60 prevents any malfunction of the variable frequency oscillatory circuit OSC when its operating frequency is less than its proper one. The logic product signal E from the ADD circuit 60 is applied to a positive input terminal of the differential integrator 62 which has applied to its negative input terminal the output F from the pulse extractor 56. The integrator 62 is shown as including an operational amplifier with a capacitive feed-back loop and serves to subtract the output from the extractor 56, or the FLIP-FLOP No. 4, from the output from the ADD circuit 60 and then integrate the resulting difference signal. The output from the integrator 62 is then applied as a control voltage to the variable frequency oscillatory circuitry OSC to control the oscillatory frequency thereof. More specifically, the output from the ADD circuit 60 functions to decrease the oscillatory frequency of the oscillator 52 while the output from the multivibrator 58 or the FLIP-FLOP No. 6 functions to increase that frequency so that the pulses C from the extractor 56 or FLIP-FLOP No. 3 always has a predetermined fixed duration which may be equal to the repetition period of the pulses being generated by the variable frequency oscillatory circuit OSC.

The sing-around signal originating from the transmitter and receiver elements 15 and 16 is frequency multiplied in the same manner as above described.

This ensures that the frequency of the sing-around signal is properly multiplied by a predetermined number $n$ irrespective of any variation in the sing-around frequency due to changes in temperature and velocity of flow of a fluid flowing through a conduit. This is true in the case of conduits having different inside diameters.

It has been found that a pulse train having a length exceeding two repetition periods of the sing-around signals, such as shown at B–3 in FIG. 7$b$, changes to a normal pulse train such as B–1 or –2 within approximately twenty sing-around signals.

Figure 8:
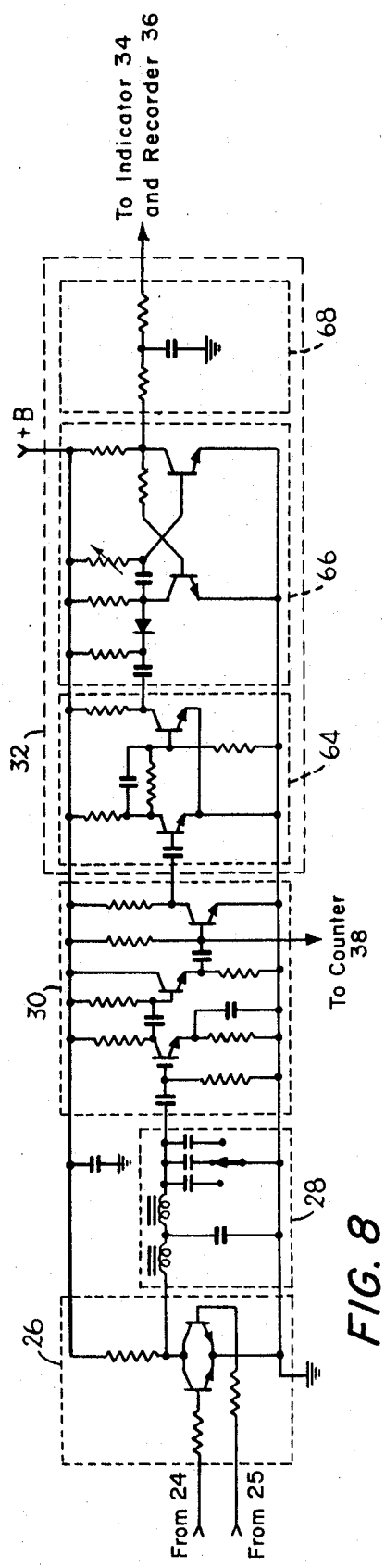
FIG. 8 is a schematic circuit diagram of a velocity of flow calculating circuitry illustrated in FIG. 1.

The outputs from both the automatic frequency multipliers 24 and 25 are supplied to the frequency comparison circuit 26. Only for purpose of illustration, those outputs are assumed to be in the forms of waveforms $b$ and $d$ shown in FIG. 2. As shown in FIG. 8, the comparison circuit 26 is preferably a NAND circuit including a pair of common emitter type transistors having emitter electrodes connected together and collector electrodes connected together. The waveforms $b$ and $d$ are supplied to the base electrodes of the transistors respectively to provide at the interconnected collector electrode a difference in frequency between two trains of the frequency multiplied sing-around signals in the form of rectangular pulses width modulated with a frequency proportional to a difference between the pulse recurrence frequencies of the waveforms $b$ and $d$ as shown at waveform $e$ in FIG. 2. These pulses correspond to zero inputs to the base electrodes of the transistors.

The width modulated pulses $e$ are applied to the low pass filter 28 shown in FIG. 8 as being adjustable in cutoff frequency to form substantially triangular pulses shown at waveform $f$ in FIG. 2 and having a pulse recurrence frequency proportional to the difference between those of the waveforms $b$ and $d$. Then the amplifier 30 converts the triangular pulses $f$ to rounded rectangular pulse as shown at waveform $g$ in FIG. 2. These pulses are, in turn, applied to the digital-to-analog conversion circuit 32 including a Schmitt circuit 64, a one-shot multivibrator 66 and a smoothing circuit 68 as shown in FIG. 8. The Schmitt circuit 64 converts the waveform $g$ to a precisely rectangular waveform $h$ as shown in FIG. 2. The rectangular waveform $h$ is applied to the one-shot multivibrator 66 to provide a rectangular waveform $i$ having a predetermined fixed duration (see FIG. 2$i$). Then the smoothing circuit 68 smooths the waveforms $i$ into an analog DC voltage as shown in FIG. 2$j$. If the output from the Schmitt circuit 64 is directly smoothed by the smoothing circuit 68 any variation in its frequency causes the output from the circuit 68 to remain unchanged because its duty cycle is approximately 50%. Therefore the one-shot multivibrator 66 is used to produce the rectangular waveforms $i$ with a predetermined fixed duration at intervals of time corresponding to the recurrence frequency of the waveforms $h$ followed by smoothing of the output from the one-shot multivibrator 66. The predetermined fixed duration is preselected to be shorter than the pulse recurrence period for the waveform $g$ having a maximum recurrence frequency and in this case may be about 0.5 millisecond. This ensures that the output from the smoothing circuit 68 is proportional to the recurrence frequency of the waveform $h$ or to the average velocity of flow. Then the analog voltage is applied to the indicator and recorder 34 and 36 respectively. Also the output from the amplifier 30 is applied to the counter 38 to indicate the velocity of flow in the digital form.

It is recalled that with the distance between the transmitter and receiver elements 14 and 16 equal to that between the elements 15 and 17, the difference between the sing-around frequencies approaches a null magnitude as the velocity of flow decreases to zero. This results in a great decrease in the response speed of the digital-to-analog conversion circuit 32.

Figure 10:
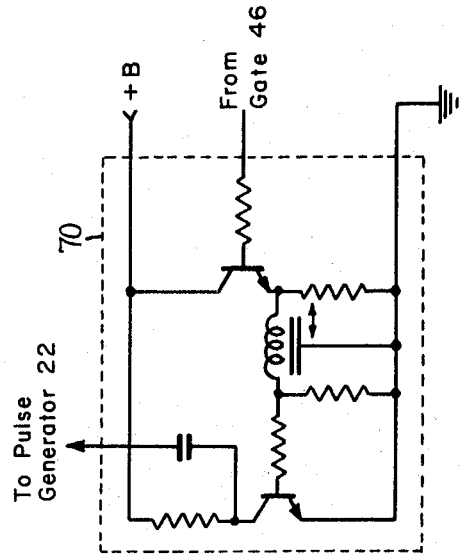
FIG. 10 is a schematic circuit diagram of one portion of the flow meter illustrated in FIG. 9.
Figure 9:
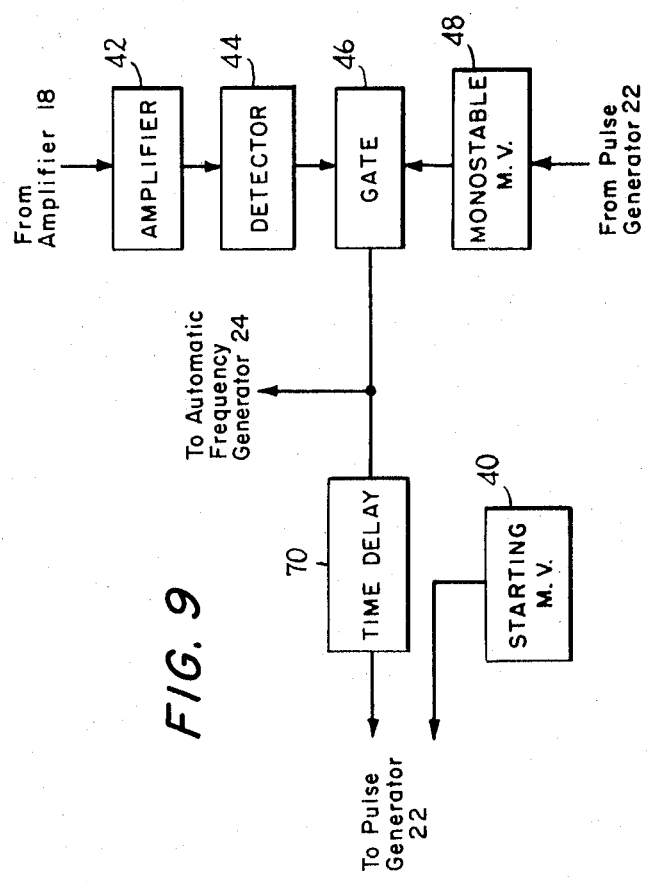
FIG. 9 is a fragmental block diagram of a modification of the invention.

The invention also contemplates elimination of this disadvantage. To this end, each of the sing-around signal generators 20 or 21 can have a time delay circuit 70 connected between the gate circuit 46 and the pulse generator 22 as shown in FIG. 9. In other respects, the arrangement is identical to that illustrated in FIG. 3 and the same reference numerals designate the components corresponding to those illustrated in FIG. 3. The time delay circuit 70 is shown in FIG. 10 as including a variable inductance to be continuously adjustable in time delay although it may be of any other suitable construction. This measure permits the time delay $\tau$ in the Equation 1 or 2 to be continuously adjustable. More specifically, when the velocity of flow is null, the time delay circuit 70 in the sing-around signal generator 20 and/or the corresponding circuit in the other generator 21 are or is adjusted to electrically impart the time delay $\tau$'s in the Equations 1 and 2 such different values that the difference between the sing-around frequencies has preliminarily any desired fixed value sufficient to prevent an appreciable decrease in response speed of the associated digital-to-analog conversion circuit 32. Then the difference between the sing-around frequencies is suitably subtracted from a difference between the measured output frequencies.

If an ultrasonic flow meter is designed to neglect any low velocity of flow it is simpler and preferable to omit the time delay circuit as above described but the time delay circuit is also effective for compensating for a difference between distances of the respective transducer-transmitter elements to the associated transducer-receiver elements. As previously described, it is considerably difficult to render such differences exactly equal to each other because the elements may often be located in incorrect positions on the outer wall surface of the associated conduit. Under these circumstances, either or both of the time delay circuits in both the sing-around signal generators can readily be adjusted in time delay to make the distance between one pair of transducer-transmitter and transducer-receiver elements equal to the distance between the other pair in terms of the ultrasonic wavelength thereby to cause one of the sing-around frequencies to be equal to the other sing-around frequency for zero velocity of flow.

Thus it will be appreciated that the time delay circuit serves to cause the fixed time delay $\tau$ in each of the Equations 1 or 2 to be electrically variable in a continuous manner in order that a difference between the upstream and downstream sing-around frequencies may have a predetermined fixed value of zero value for a null velocity of flow.

In case two trains of ultrasonic pulses travel through a fluid flowing through a conduit in both directions identical and opposite to the direction of its flow but at angles to the longitudinal axis of the conduit as shown in FIG. 1, it will be readily understood that, as the fluid increases in velocity of flow, a sing-around frequency due to the ultrasonic pulse travelling along the flow of fluid increases and the other sing-around frequency, due to the ultrasonic pulses travelling in a countercurrent relationship through the flow of fluid, decreases. If the two trains of sing-around frequencies are assumed to be equal to each other for the fluid maintained stationary then whichever of the frequencies is higher can determine the direction of fluid's flow. Namely the polarity of the difference between the sing-around frequencies can determine the direction of the fluid's flow.

Referring now to FIGS. 11 and 12, there is illustrated a modification of the invention applied to the determination of a direction in which a fluid is flowing through a conduit. An arrangement illustrated comprises a frequency comparison circuit 80 including a FLIP-FLOP, a low-pass filter 82, a differentiation circuit 84 and a polarity sensing circuit 86 serially connected in the order named. The latter circuit is connected through a pair of terminals 88 and 89 to an indication FLIP-FLOP 90 having a pair of output terminals 92 and 93 connected to a pair of indicators 94 and 95.

The FLIP-FLOP 80 is adapted to be held in its reset position by having no voltage applied to its reset input whereby it is prevented from operating in response to a voltage applied to the set input. When the FLIP-FLOP 80 is not held in its reset position it can respond only to a decaying tail edge of a rectangular pulse applied to its set input to produce a rectangular pulse having a predetermined fixed amplitude.

Only for purpose of illustration, it is assumed that a train of sing-around signals frequency multiplied in the manner as previously described to have a pulse recurrence frequency of $nf_1$ (see waveform $a$ in FIG. 13) is applied to the set input to the FLIP-FLOP 80 while a train of similar signals having a pulse recurrence frequency of $nf_2$ is applied to the reset input with $f_1$ greater than $f_3$. Then the FLIP-FLOP 80 provides a train of width modulated pulses (see waveform $c$ in FIG. 7). If $f_1$ is smaller than $f_2$ the FLIP-FLOP 80 will provide trains of width modulated pulses as shown at waveform $c'$ in FIG. 7 which will readily be understood when it is considered that the sing-around signals ($nf_2$) are applied to the set input while the sing-around signals ($nf_1$) are applied to the reset input. The output waveform $c$ or $c'$ is applied to the low-pass filter 82 to produce a saw tooth voltage having a positive or negative slope in accordance with a relative value of one to the other of the sing-around frequencies of $f_1$ and $f_2$. That is, if $f_1 > f_2$, the slope is positive as shown at waveform $d$ in FIG. 3 while $f_1 < f_2$ the slope is negative as shown at waveform $d'$. The saw-tooth voltage is differentiated by the differentiation circuit 84 to form a negative or positive pulse corresponding respectively to the tail or leading edge of the voltage (see waveform $e$ or $e'$ in FIG. 13).

Then the pulses $e$ or $e'$ are applied to the polarity sensing circuit 86. As shown in FIGS. 11 and 12, the circuit 86 comprises a phase inverter 96 including a transistor and a pair of transistorized pulse amplifiers 98 and 99 connected in parallel circuit relationship to the inverter. From FIG. 12 it is seen that with a signal applied to the base electrode of the inverting transistor, its emitter and collector electrodes have developed thereon the corresponding signals similar in phase to and reversed from the signal on the base electrode. The amplifiers 98 and 99 each are adapted to respond only to a positive pulse applied to the emitter electrode to provide an output. A diode is connected in the collector circuit to prevent the amplifier from erroneously functioning due to a low input applied thereto.

Assuming that a positive pulse is applied to the inverter 96, a negative pulse is developed on its collector electrode while at the same time a positive pulse is developed on its emitter electrode. Since the amplifiers 98 and 99 are operative in response to only a positive pulse the amplifier 98 is inoperative but the amplifier 99 is operative to produce a negative pulse at the terminal 89. Similarly a negative pulse applied to the inverter 96 provides a negative pulse at the terminal 88 alone. The output from either one of the amplifiers 98 or 99 is then applied to the indication FLIP-FLOP 90.

The FLIP-FLOP 90 is adapted to respond to a pulse applied to its input terminal 89 to turn the output terminal 93 "ON" while turning the output terminal 92 "OFF." These "ON" and "OFF" states remain unchanged irrespective of the succeeding pulses applied to the terminal 89. However the application of a pulse to the terminal 88 causes the output terminals 92 and 93 to turn "ON" and "OFF" respectively.

When the output terminal 92 is in the "ON" state the indicator 94 is energized to indicate that $nf_1$ is greater than $nf_2$. On the other hand, the terminal 93 turned "ON" permits the indicator 95 to be energized indicating that $nf_1$ is smaller than $nf_2$. Thus which of the indicators 94 and 95 has been energized indicates a direction in which a fluid is flowing through the associated conduit.

It is to be noted that in the arrangement as illustrated in FIG. 14 the measurement of velocity of flow of a fluid can be easily accomplished by comparing the sing-around frequencies $nf_1$ and $nf_2$ applied to the FLIP-FLOP 80 with each other in the manner as previously described.

It is to be understood that the use of an asymmetric FLIP-FLOP in place of the comparison FLIP-FLOP 80 permits the measurement of a velocity of flow or flow rate simultaneously with the determination of a direction of flow thereof because the low pass filter 28 provides an output frequency equal to a difference between the particular sing-around frequencies.

While the invention as shown in FIG. 14 has been described in terms of the frequency multiplied sing-around frequencies $nf_1$ and $nf_2$ it is to be understood that it is equally applicable to the determination of a polarity of a difference between nearly equal frequencies of any pair of signals formed into rectangular waveforms.

The invention has several advantages. For example, it provides an ultrasonic flow meter having a high response speed which could not previously be obtained. This permits the detection of any variation in flow velocity of a fluid flowing through a conduit of large inside diameter which has been previously unknown, because of turbulent and vertical motions of the fluid within the conduit and the effects of pressure waves produced by the associated water wheel, runners, pump, etc., upon the stream of fluid. Further the invention can measure the velocity of a flow with a high degree of accuracy under any conditions. For example, a response speed as high as 17 milliseconds was reached with a conduit one meter in inside diameter through which a fluid flowed at a speed of one meter per second and with a frequency multiplication of 100.

As an example, an ultrasonic flowmeter such as shown in FIG. 1 was used with a section of conduit having an inside diameter of 800 mm. and a wall thickness of 27 mm. The resulting record is illustrated in FIG. 14 wherein the axis of abscissas represents time in seconds and the axis of the ordinates represents a flow rate Q in cubic meters for hours.

While the invention has been illustrated and described in conjunction with several preferred embodiments thereof it is to be understood that various changes in the details of construction and the arrangement and combination of parts may be resorted to without departing from the spirit and scope of the invention. For example, a single pair of transducer-transmitter and transducer-receiver elements 14 and 16 may be used with satisfactory result. In this case, each of the elements serves as a combined transducer-transmitter and receiver element. That is the transmitter and receiver elements 14 and 16 respectively serve as a first and a second transducer-transmitter element while the elements 16 and 14 respectively serve as a first and a second transducer-receiver element.

What we claim is:

1. In a fluid metering device comprising a first sing-around signal loop and a second sing-around signal loop, each sing-around signal loop comprising an electroacoustic transducer-receiver and an electroacoustic transducer-transmitter acoustically coupled in operation to a fluid stream, the transducer-transmitter of one loop being disposed upstream of the transducer-receiver of the same loop and the transducer-receiver of the other loop being disposed upstream of the transducer-transmitter of said other loop, for generating sing-around signals in each loop having a pulse repetition rate varying in dependence upon instantaneous velocities of said fluid stream, each loop comprising an automatic frequency multiplier to multiply the frequency of the sing-around signals by a predetermined constant $n$ irrespective of variations in the frequency of the sing-around signals, frequency comparison circuit means comparing the multiplied frequencies of the sing-around signals in said loops and having an output signal corresponding to a difference frequency, means to convert the difference frequency signal to an analog quantity representative of the instantaneous velocity of the fluid stream, and each loop including an adjustable time-delay circuit for selectively delaying the sing-around signals.

2. In a fluid metering device comprising a first sing-around signal loop and a second sing-around signal loop, each sing-around signal loop comprising an electroacoustic transducer-receiver and an electroacoustic transducer-transmitter acoustically coupled in operation to a fluid stream, the transducer-transmitter of one loop being disposed upstream of the transducer-receiver of the same loop and the transducer-receiver of the other loop being disposed upstream of the transducer-transmitter of said other loop, means for generating sing-around signals in each loop having a pulse repetition rate varying in dependence upon instantaneous velocities of said fluid stream, each loop comprising an automatic frequency multiplier to multiply the frequency of the sing-around signals by a predetermined constant $n$ irrespective of variations in the frequency of the sing-around signals, frequency comparison circuit means comparing the multiplied frequencies of the sing-around signals in said loops and having an output signal corresponding to a difference frequency, means to convert the difference frequency signal to an analog quantity representative of the instantaneous velocity of the fluid stream, said automatic frequency multiplier means comprising a first bistable multivibrator capable of being normally set with alternate ones of the sing-around signals and reset with the remaining signals to form a rectangular pulse having a duration equal to a period of time between the particular pair of succeeding sing-around signals, a variable frequency oscillator normally responding to each of the sing-around signals to generate a train of pulses with a controlled frequency, a counter connected to said variable frequency oscillator to stop the oscillation of the latter upon counting the $n$th pulse from the oscillator, a pulse extractor connected to said variable frequency oscillator to respond only to that pair of succeeding pulses following each of the sing-around signals in the train of pulses being generated by the oscillator to produce a rectangular pulse having a duration equal to the repetition period of the pulses being generated by the oscillator, a second bistable multivibrator responding to both the $n$th pulse from the variable frequency oscillator and one of the sing-around signals following said $n$th pulse to form a rectangular pulse, an ADD circuit connected to said first and second bistable multivibrators, a differential integrator connected to both said ADD circuit and said pulse extractor to provide a control signal, means for applying said control signal to said variable frequency oscillator to control the oscillatory frequency thereof so as to maintain a predetermined fixed duration of said rectangular pulse from said second bistable multivibrator, and means for causing the sing-around signals applied to said first and second bistable multivibrators and said variable frequency oscillator to be ineffective during the counting operation of the counter.

3. In a fluid metering device comprising a first sing-around signal loop and a second sing-around signal loop, each sing-around signal loop comprising an electroacoustic transducer-receiver and an electroacoustic transducer-transmitter acoustically coupled in operation to a fluid stream, the transducer-transmitter of one loop being disposed upstream of the transducer-receiver of the same loop and the transducer-receiver of the other loop being disposed upstream of the transducer-transmitter of said other loop, means for generating sing-around signals in each loop having a pulse repetition rate varying in dependence upon instantaneous velocities of said fluid stream, each loop comprising an automatic frequency multiplier to multiply the frequency of the sing-around signals by a predetermined constant $n$ irrespective of variations in the frequency of the sing-around signals, frequency comparison circuit means comparing the multiplied frequencies of the sing-around signals in said loops and having an output signal corresponding to a difference frequency, means to convert the difference frequency signal to an analog quantity representative of the instantaneous velocity of the fluid stream, said frequency comparison circuit means being connected for and includes means comparing said sing-around signals of said loops multiplied by the respective automatic frequency multiplier to provide said difference frequency between the sing-around signals of said loops, a low-pass filter connected to said frequency comparison circuit means, a differentiation circuit connected to said low-pass filter to differentiate the output from the latter, a polarity sensing circuit connected to said differentiation circuit to provide a control signal determined by the polarity of the output from the differentiation circuit, and a pair of indicating means connected to said polarity sensing circuit to be selectively energized by said polarity sensing circuit to indicate the direction of flow of said fluid stream.

References Cited

UNITED STATES PATENTS

| | | | |
|---|---|---|---|
| 2,669,121 | 2/1954 | Garman et al. | 73—194 |
| 2,949,773 | 8/1960 | Batchelder | 73—194 |
| 3,290,934 | 12/1966 | Brown et al. | 73—194 |

OTHER REFERENCES

H. F. Messias, "Ultrasonics Measures Flow Velocity of Rivers," Electronics, Oct. 13, 1961, pp. 56–59.

CHARLES A. RUEHL, Primary Examiner